Dec. 22, 1925.  
J. APPLETON  
1,566,571  
DRINKING FOUNTAIN FOR BIRDS OR DOMESTIC ANIMALS  
Filed Oct. 2, 1922
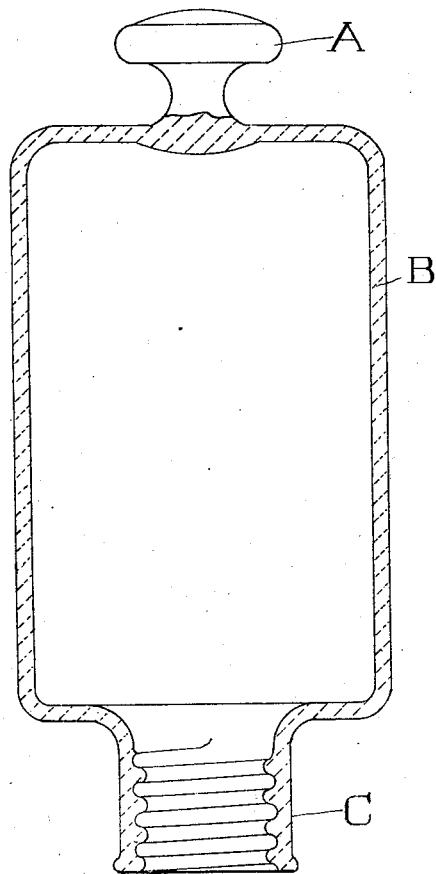
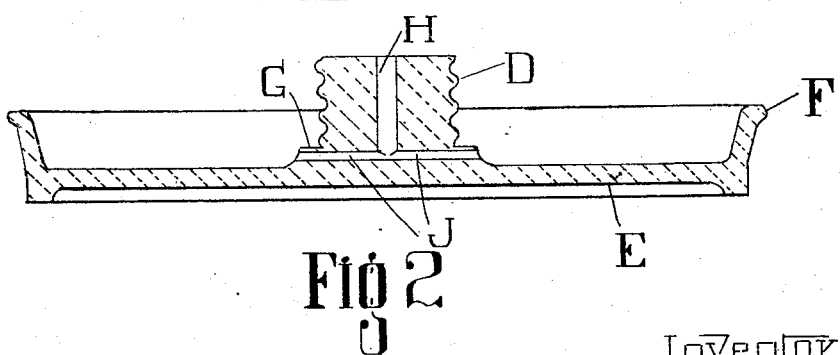

Patented Dec. 22, 1925.

1,566,571

UNITED STATES PATENT OFFICE.

JOSEPH APPLETON, OF ST. HELENS, ENGLAND.

DRINKING FOUNTAIN FOR BIRDS OR DOMESTIC ANIMALS.

Application filed October 2, 1922. Serial No. 591,859.

*To all whom it may concern:*

Be it known that I, JOSEPH APPLETON, a subject of the King of Great Britain, residing in St. Helens, in the county of Lancaster and Kingdom of England, have invented certain new and useful Improved Drinking Fountains for Birds or Domestic Animals, of which the following is a specification.

This invention relates to an improved drinking fountain for birds or domestic animals of the bird-fountain type.

According to the invention the drinking fountain comprises a tall glass jar having a single internally threaded neck at the bottom which engages an externally threaded cylindrical member or boss provided with perforations or channels extending to provide communication between the interior of the jar and a dish surrounding the boss. Preferably these channels are horizontal and radial each communicating with a vertical axial channel. The dish is preferably made of a single piece of glass.

The device is illustrated in the accompanying drawing, in which:—

Figure 1 is a sectional elevation of the bottle.

Figure 2 is a sectional elevation of the dish.

B is a tall glass jar having a knob A and an internally threaded glass neck C, which engages with the externally threaded boss D mounted centrally within the dish E having an external flange F, so that liquid can be contained between the boss D and flange F. The boss is provided with two radial channels J and a vertical axial channel H of larger diameter.

The vessel B is charged with water and screwed into position. Air enters by channels J and H to replace the water which flows into the dish.

Although the device is styled a drinking fountain it can be used for any other purpose for which a steadily renewed supply of liquid is desired in a dish.

I declare that what I claim is:—

A liquid supply vessel of the bird fountain type comprising a tall glass jar, a single internally threaded neck on the bottom of said jar, a concave externally flanged glass dish adapted to contain liquid and an externally threaded vertical glass boss integral with and central within said dish and having radial and axial channels for the passage of fluid.

In witness whereof, I have hereunto signed my name this 19th day of September, 1922.

JOSEPH APPLETON.